United States Patent [19]
Goldberg

[11] Patent Number: 5,530,437
[45] Date of Patent: Jun. 25, 1996

[54] METHOD AND APPARATUS FOR GENERATING A SIMULCAST RESPONSE FROM A PLURALITY OF PORTABLE COMMUNICATION UNITS

[75] Inventor: Steven J. Goldberg, Coral Springs, Fla.

[73] Assignee: Motorola Inc., Schaumberg, Ill.

[21] Appl. No.: 113,490

[22] Filed: Aug. 27, 1993

[51] Int. Cl.⁶ ................................................. H04Q 9/00
[52] U.S. Cl. ............................ 340/825.08; 340/825.44; 340/825.54
[58] Field of Search ................ 340/825.08, 825.44, 825.47, 825.49, 825.52, 825.54; 455/57.1; 379/56, 57; 370/18, 85.8, 95.2; 371/32, 33

[56] References Cited

U.S. PATENT DOCUMENTS

| | | | |
|---|---|---|---|
| 4,875,038 | 10/1989 | Siwiak et al. | 340/825.44 |
| 4,896,151 | 1/1990 | Kuranami et al. | 340/825.52 |
| 4,918,437 | 4/1990 | Jasinski et al. | 340/825.44 |
| 5,124,697 | 6/1992 | Moore | 340/825.44 |
| 5,153,582 | 10/1992 | Davis | 340/825.44 |
| 5,162,790 | 11/1992 | Jasinski | 340/825.44 |
| 5,339,073 | 8/1994 | Dodd et al. | 340/825.54 |

*Primary Examiner*—Donald J. Yusko
*Assistant Examiner*—Edwin C. Holloway, III
*Attorney, Agent, or Firm*—R. Louis Breeden

[57] ABSTRACT

A method and apparatus identify (822) respondents to a poll transmitted (806) in a radio communication system (100) comprising a transmitter (104) and a plurality of receivers (103, 105). A subset of a plurality of portable communication units (PCUs) (108) are each programmed (804, 806) with a bit pattern (510, 512, 514) corresponding uniquely to each PCU (108) and chosen such that when a group of at least two PCUs (108) are received simultaneously, the resultant received interference bit pattern provides a non-zero probability of correctly identifying at least a portion of the group, and a substantially zero probability of erroneously identifying a PCU (108) not in the group. The method further comprises the steps of transmitting (808) thereafter from the subset of PCUs (108) simultaneous, co-channel responses to the poll, each response comprising one of the programmed bit patterns (510, 512, 514), and determining (822) therefrom identities of received PCUs (108) by the interference bit patterns received at the plurality of receivers (103, 105).

21 Claims, 6 Drawing Sheets

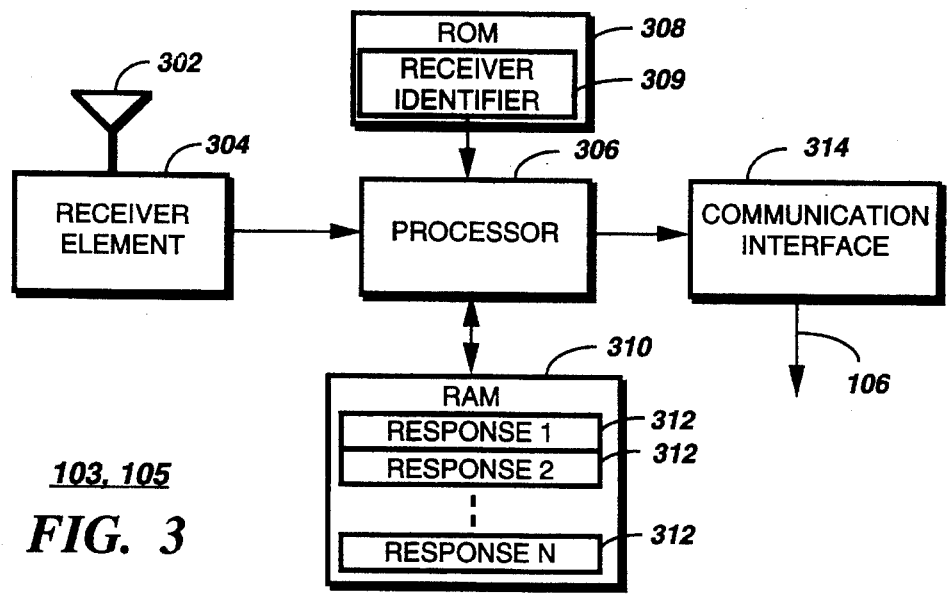
FIG. 3  103, 105
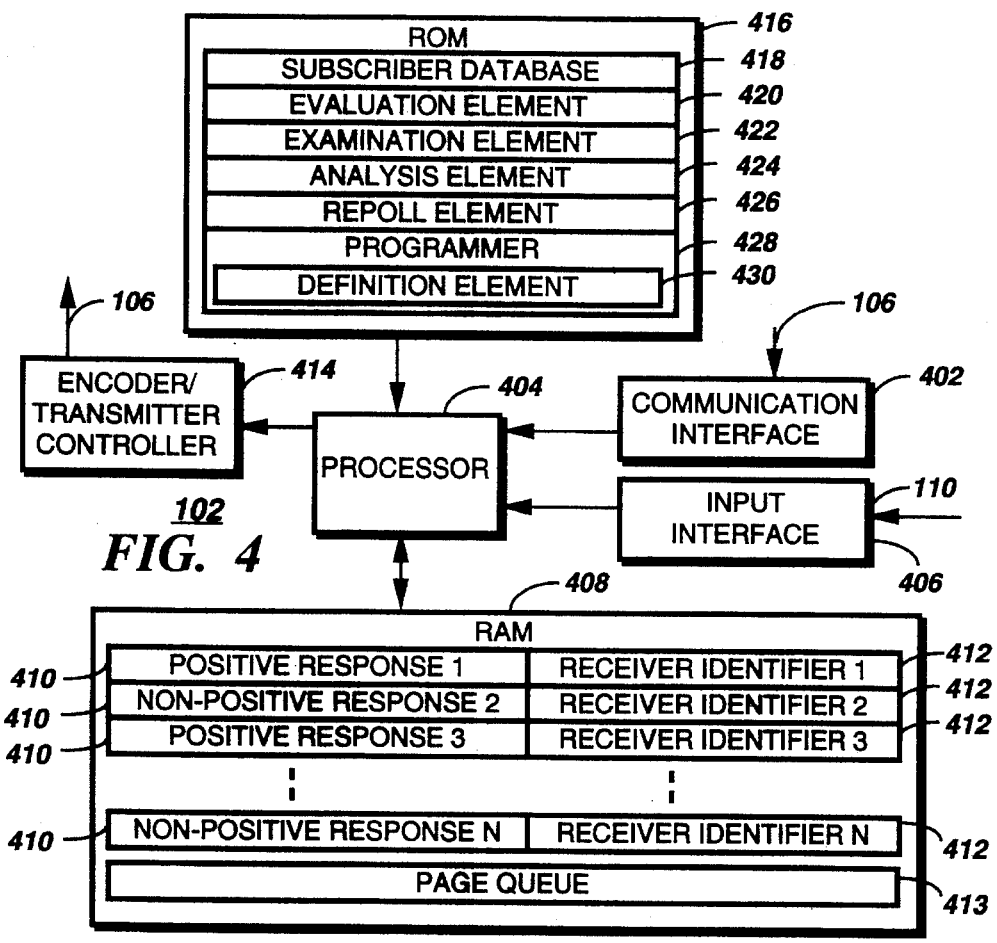
FIG. 4  102

FIG. 5
500

| PORTABLE COMM. UNIT (516) | SUBSET BITS (508) | UNIQUE BIT PATTERN (518) |
|---|---|---|
| 1 | ...0 0 | 0 0 1 |
| 2 | ...0 0 | 0 1 0 |
| 3 | ...0 0 | 1 0 0 |
| 4 | ...0 1 | 0 0 1 |
| 5 | ...0 1 | 0 1 0 |
| 6 | ...0 1 | 1 0 0 |

FIG. 6
600

| INTERFERING PORTABLE COMM. UNITS (610) | POSSIBLE RECEIVED UNIQUE BIT PATTERN (612) | POSSIBLE COMM. UNIT (614) | | |
|---|---|---|---|---|
| | | 3 | 2 | 1 |
| 1 & 2 | 0 X X | NO | YES | YES |
| 1 & 3 | X 0 X | YES | NO | YES |
| 2 & 3 | X X 0 | YES | YES | NO |
| 1, 2, & 3 | X X X | YES | YES | YES |

FIG. 7
700

| RECEIVED UNIQUE BIT PATTERN (702) | IDENTIFIED COMM. UNIT (704) | | |
|---|---|---|---|
| | 3 | 2 | 1 |
| 0 0 0 | NO | NO | NO |
| 0 0 1 | NO | NO | YES |
| 0 1 0 | NO | YES | NO |
| 1 0 0 | YES | NO | NO |
| 0 1 1 | NO | YES | YES |
| 1 0 1 | YES | NO | YES |
| 1 1 0 | YES | YES | NO |
| 1 1 1 | YES | YES | YES |

800

METHOD AND APPARATUS FOR GENERATING A SIMULCAST RESPONSE FROM A PLURALITY OF PORTABLE COMMUNICATION UNITS

FIELD OF THE INVENTION

This invention relates in general to radio communication systems, and more specifically to a method and apparatus for generating a simulcast response to a poll, the response generated from a plurality of portable communication units.

BACKGROUND OF THE INVENTION

Radio communication systems that utilize polling to establish communications are well known. An example is a cellular telephone system, in which a fixed transmitter network polls for a portable unit for which there is an incoming call, after which the called portable unit responds to establish two-way communications. Another example is a radio paging system that utilizes acknowledge-back pagers.

An "ack-back" pager employs a low-power transmitter that can transmit an acknowledgment response identifying the pager whenever a poll comprising an address specifically assigned to the pager is sent from a high-power fixed communication unit and received by the pager. To avoid communication collisions among responding pagers, the poll can also contain information that controls each pager to respond at a specific time, or on a specific communication channel. In addition, the ack-back transmitter transmits at a low bit rate, e.g., 100 bits per second, and the fixed communication unit utilizes narrow bandwidth, highly sensitive receivers to compensate for the low power of the ack-back transmitter, i.e., to help balance inbound and outbound transmission range.

A problem can result in a large ack-back communication system due to the low bit rate of the ack-back transmissions compared to the much higher bit rate, e.g., 2400 bits per second, utilized for the poll transmissions from the fixed communication unit. The problem arises when communication traffic increases to a point at which there is insufficient ack-back channel capacity to handle the volume of acknowledgment responses required, thereby significantly delaying poll response.

Thus, what is needed is a method and apparatus for increasing the volume of acknowledgment responses that can be transmitted in an ack-back communication system. A method and apparatus is needed that does not require additional ack-back channels or a utilization of a higher bit rate on the ack-back channels.

SUMMARY OF THE INVENTION

One aspect of the present invention is a method of determining identities of respondents to a poll transmitted by a fixed communication unit in a radio communication system including a central controller, a plurality of portable communication units, and the fixed communication unit. The fixed communication unit comprises a transmitter and a plurality of receivers. The method comprises the step of programming a plurality of bit patterns within a subset of the plurality of portable communication units for identifying individual portable communication units of the subset. Each bit pattern corresponds uniquely to a portable communication unit and is chosen such that when a group of at least two of the portable communication units are received simultaneously by a receiver of the plurality of receivers, thereby producing an interference bit pattern in the receiver, the interference bit pattern provides a non-zero probability of correctly identifying at least a portion of the group, and a substantially zero probability of erroneously identifying a portable communication unit not in the group. The method further comprises the steps of transmitting thereafter from the subset a plurality of simultaneous, co-channel responses to the poll, a response comprising one of the plurality of bit patterns transmitted without modification, exactly as programmed, and determining therefrom identities of received portable communication units of the subset by the interference bit patterns received by the plurality of receivers.

Another aspect of the present invention is an apparatus in a radio communication system for transmitting a poll and determining identities of respondents to the poll. The apparatus comprises a central controller for controlling the radio communication system, and a fixed communication unit coupled to the central controller for transmitting the poll and further for receiving a response to the poll. The fixed communication unit comprises a transmitter and a plurality of receivers positioned in geographically disperse locations. The apparatus further comprises a plurality of portable communication units coupled to the fixed communication unit for receiving the poll and generating a response, and a programmer for coupling to ones of the plurality of portable communication units for programming therein a plurality of bit patterns for identifying each individual portable communication unit within a subset of the plurality of portable communication units. Each bit pattern corresponds uniquely to a portable communication unit and is chosen such that when a group of at least two of the portable communication units are received simultaneously by a receiver of the plurality of receivers, thereby producing an interference bit pattern in the receiver, the interference bit pattern provides a non-zero probability of correctly identifying at least a portion of the group, and a substantially zero probability of erroneously identifying a portable communication unit not in the group. The plurality of portable communication units each comprise a transmitter for transmitting from the subset, after programming by the programmer, a plurality of substantially simultaneous, co-channel responses to the poll, a response comprising one of the plurality of bit patterns transmitted without modification, exactly as programmed by the programmer. The central controller comprises a processor coupled to the transmitter for determining identities of received portable communication units of the subset by interference bit patterns received by the plurality of receivers.

BRIEF DESCRIPTION OF THE DRAWINGS

FIG. 3 is an electrical block diagram of a receiver in a fixed communication unit in accordance with the preferred embodiment of the present invention.

FIG. 4 is an electrical block diagram of a central controller in accordance with the preferred embodiment of the present invention.

FIG. 5 is a portion of a bit assignment diagram for the acknowledge-back communication system in accordance with the preferred embodiment of the present invention.

FIG. 6 is an interference bit pattern diagram for the acknowledge-back communication system in accordance with the preferred embodiment of the present invention.

FIG. 7 is a detection diagram for the acknowledge-back communication system in accordance with the preferred embodiment of the present invention.

DESCRIPTION OF THE PREFERRED EMBODIMENT

Acknowledge-back communication systems comprise portable selective call receivers that utilize low-power, narrowband transmitters to transmit an acknowledgement response to the communication system after receiving a poll. Such systems are disclosed in U.S. Pat. No. 5,124,697 to Moore, entitled "Acknowledge Back Pager," U.S. Pat. No. 5,153,582 to Davis, entitled "Method and Apparatus for Acknowledging and Answering a Paging Signal," and U.S. Pat. No. 4,875,038 to Siwiak et al., entitled "Frequency Division Multiplexed Acknowledge Back Paging System." The above listed U.S. Patents are hereby incorporated herein by reference.

A way in which poll response traffic in an acknowledge-back communication system can be increased in accordance with the preferred embodiment of the present invention is to use a simulcast technique in combination with a selective code assignment plan that allows multiple respondents to be identified from a single response. Respondents are grouped into subsets having identification codes comprising a common bit pattern plus a selected unique bit pattern assigned to each individual subset member. In response to a poll directed to the subset, the subset members respond simultaneously on a common response channel and can be identified by the acknowledge-back communication system, as will be described herein below.

Figure 1:
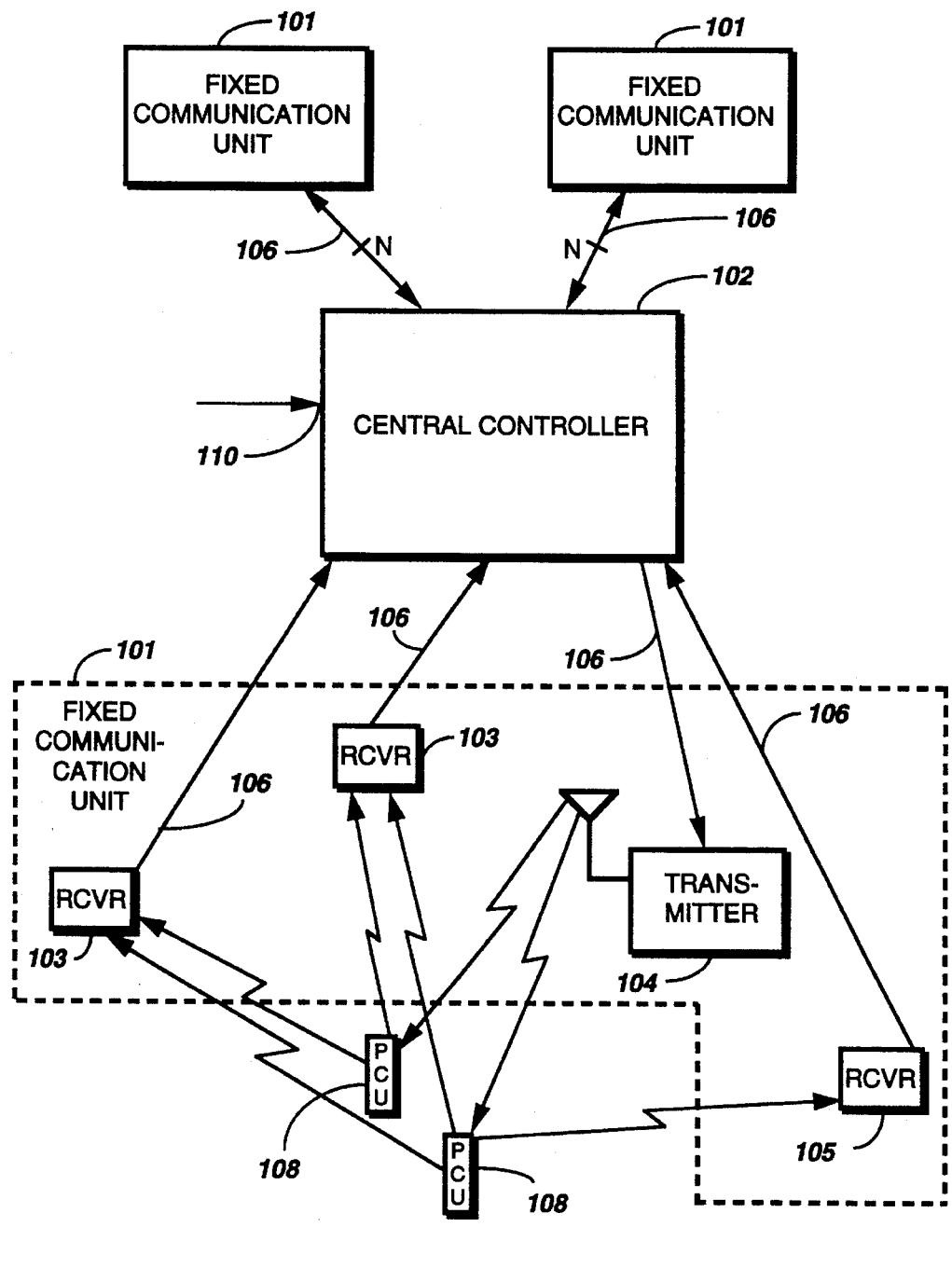
FIG. 1 is an electrical block diagram of an acknowledge-back communication system in accordance with the preferred embodiment of the present invention.

Referring to FIG. 1, an electrical block diagram of an acknowledge-back communication system 100 in accordance with the preferred embodiment of the present invention comprises a central controller 102 having a telephone input 110 for interfacing with the Public Switched Telephone Network in a manner well known in the art. Preferably, the central controller 102 is similar to a model E09PED0552 PageBridge® paging terminal manufactured by Motorola, Inc. of Schaumburg, Ill., modified with special firmware elements in accordance with the preferred embodiment of the present invention, as described hereinbelow. It will be appreciated that other similar equipment may be used as well for the central controller 102.

The central controller 102 is coupled to at least one fixed communication unit 101, preferably by a plurality of telephone lines 106. It will be appreciated that radio links can be used as well to couple the central controller 102 with the fixed communication unit 101.

The fixed communication unit 101 comprises a plurality of receivers 103, 105 positioned in geographically disperse locations, and a transmitter 104. The transmitter 104 and the plurality of receivers 103, 105 are coupled by radio links with a plurality of portable communication units 108 for sending and receiving information to and from the portable communication units 108. Preferably, the transmitter 104 is similar to a model C73 PURC 5000® transmitter manufactured by Motorola, Inc. of Schaumburg, Ill. It will be appreciated that other similar transmitters may be used as well for the transmitter 104.

The plurality of receivers 103, 105 and the portable communication units 108 will be described in further detail herein below. It will be appreciated that the acknowledge-back communication system 100 will comprise a plurality of the fixed communication units 101, as depicted in FIG. 1, whenever communication traffic or geographic coverage requires more than a single fixed communication unit 101.

During operation of the acknowledge-back communication system 100 in accordance with the preferred embodiment of the present invention, callers place telephone calls to the telephone input 110 to request that specific ones of the portable communication units 108 be signaled, thereby forming a random group of portable communication units 108 to be signaled. Preferably, the callers are using a suitable input device, e.g., a tone dialing telephone or an alphanumeric page entry device, so, that a message, e.g., a call-back number, is entered as well. The central controller 102 preferably formats and queues a plurality of selective call addresses corresponding to the random group for subsequent transmission.

Next, the central controller 102 formats information along with the queued selective call addresses, the information comprising instructions for each member of the random group, designating a response bit pattern to be used by each member of the random group during a simultaneous, co-channel response. The central controller 102 also preferably designates a time and a channel to be utilized for the response. The central controller 102 then forwards the selective call addresses and associated information to the transmitter 104 in a manner well known in the art. The transmitter 104 transmits the selective call addresses and associated information to the portable communication units 108 using a well-known paging protocol, such as the Golay Sequential Code, on a paging channel. In response to members of the random group receiving the page and finding that the selective call address matches a selective call address programmed therein, the members each acknowledge receipt of the page by simultaneously transmitting the designated identification bit pattern therefor on the designated response channel at the designated time.

As depicted, for example, in FIG. 1, the receivers 103 are each within transmission range of two portable communication units 108, and will thus receive an "interference bit pattern" resulting from mixing of the response signals from the two portable communication units 108. The receiver 105 is within transmission range of only one of the portable communication units 108, and thus will receive the response without interference. When a portion of the plurality of the receivers 103, 105 receive the responses and communicate the responses to the central controller 102 the central controller 102 analyzes the totality of responses to determine the identities and probable locations of the respondents in accordance with the preferred embodiment of the present invention, as will be described in greater detail herein below.

After determining the identities and probable locations of the respondents, the central controller 102 preferably selects the fixed communication unit 101 nearest each responding portable communication unit 108 for further communications with each responding portable communication unit 108.

Figure 2:
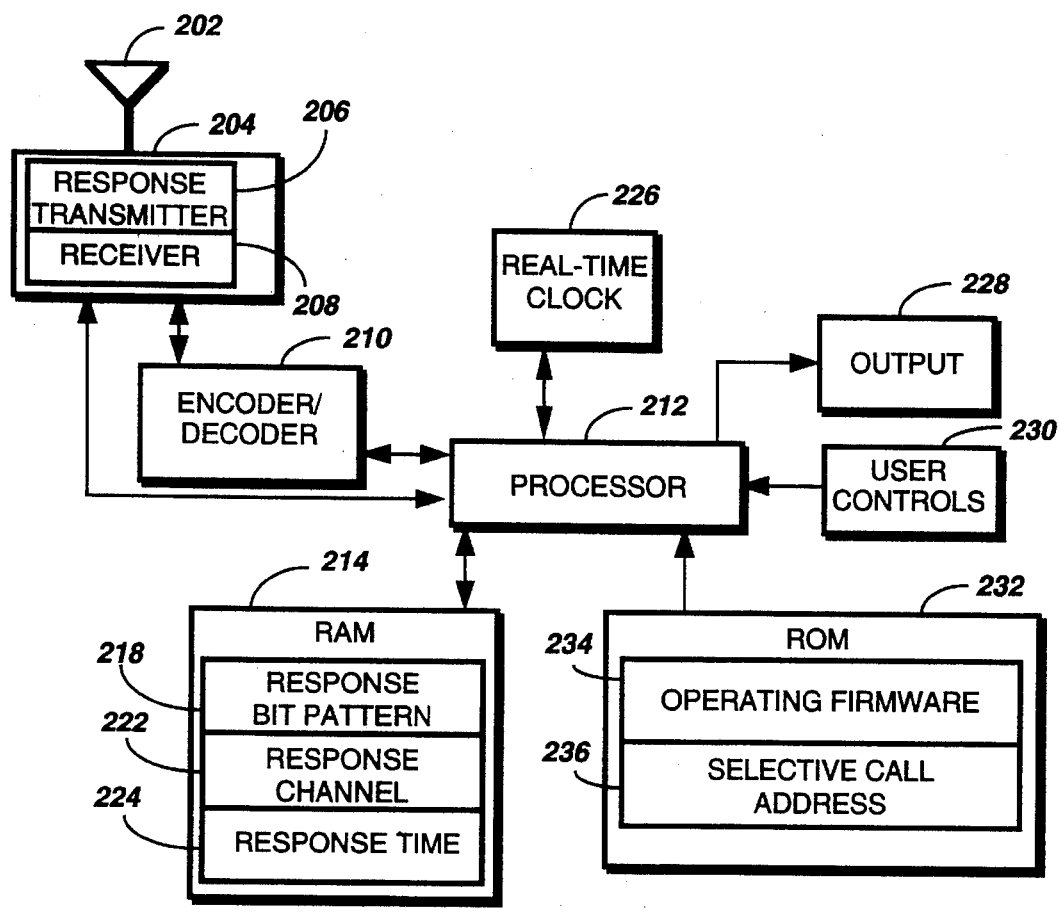
FIG. 2 is an electrical block diagram of a portable communication unit in accordance with the preferred embodiment of the present invention.

Referring to FIG. 2, an electrical block diagram of the portable communication unit 108 in accordance with the preferred embodiment of the present invention comprises an antenna 202 for intercepting a radio signal comprising an address and information from the transmitter 104 and for returning a response to the plurality of receivers 103, 105. The antenna 202 is coupled to a transceiver 204 comprising a receiver 208 and a response transmitter 206 for demodulating the intercepted radio signal and transmitting the response, respectively. Preferably, the response transmitter 206 is a conventional low-power, narrowband, binary FSK transmitter, and the receiver 208 is similar to the receiver used in the model A03KLB5962CA ADVISOR® pager manufactured by Motorola, Inc. of Schaumburg, Ill. It will be appreciated that other similar receivers can be used as well for the receiver 208.

An encoder/decoder 210 is coupled to the transceiver 204 for decoding a received address and for encoding a response thereto. The encoder/decoder 210 is coupled to a processor 212 for controlling the encoder/decoder 210 and for responding to addresses decoded therein. The processor 212 is preferably one of the MC68HC05C8 or C11 series microcomputers manufactured by Motorola, Inc. of Schaumburg, Ill. It will be appreciated that other similar processors can be used as well for the processor 212. The processor 212 is further coupled to the transceiver 204 for control thereof and for processing the received information.

A real-time clock 226 is also coupled to the processor 212 for providing real-time control of the response. In addition, a random access memory (RAM) 214 is coupled to the processor 212 for temporary storage of various operating parameters received in the information from the transmitter 104, the operating parameters comprising a response bit pattern 218 for identifying the respondent in accordance with the present invention. In addition, the operating parameters preferably further comprise a response channel 222 defining the channel to be used for the response, and a response time 224 for controlling the initiation time of the response. It will be appreciated that designation of the response channel 222 can be omitted in a system that utilizes a single response channel. It will be further appreciated that the designation of the response time 224 can be omitted in a system that requires initiation of the response a fixed time interval after a marker transmitted in the information from the transmitter 104.

Also coupled to the processor 212 is a read-only memory (ROM) 232 comprising operating firmware 234 for controlling the portable communication unit 108, and at least one selective call address 236 to which the portable communication unit is responsive. An output element 228 comprising a display is coupled to the processor 212 for displaying a received message. User controls 230, such as well-known buttons and knobs also are coupled to the processor 212 for providing control of the portable communication unit 108 by the user.

It will be appreciated that programmable read-only memory (PROM), electrically erasable programmable read-only memory (EEPROM), electrically alterable read-only memory (EAROM), and other similar forms of non-volatile memory may be substituted as well for the ROM 232. It will be further appreciated that the RAM 214, the ROM 232, a portion of the real-time clock 226, the encoder/decoder 210, and the processor 212 may be integrated as one or more contiguous integrated circuits as well.

Referring to FIG. 3, an electrical block diagram of the receiver 103, 105 in the fixed communication unit 101 in accordance with the preferred embodiment of the present invention comprises an antenna 302 for intercepting the responses from the portable communication units 108. A receiver element 304 is coupled to the antenna 302 for demodulating the intercepted responses. The receiver element 304 preferably is a conventional double-conversion RF receiver having a bandpass compatible with the narrowband responses from the portable communication units 108. The receiver element 304 is coupled to a processor 306 for processing the received demodulated responses. The processor 306 is preferably one of the MC68HC05C8 or C11 series microcomputers manufactured by Motorola, Inc. of Schaumburg, Ill. It will be appreciated that other similar processors can be used as well for the processor 306. The processor 306 is coupled to a RAM 310 comprising memory locations 312 for storing the responses received by the receiver 103, 105. The processor 306 is further coupled to a ROM 308 comprising a pre-programmed receiver identifier 309 for identifying the receiver 103, 105 to the central controller 102 when the receiver 103, 105 communicates with the central controller 102. The processor 306 is also coupled to a conventional communication interface 314, e.g., an RS-232 interface and modem, for communicating with the central controller 102 over one of the telephone lines 106 to report the received responses stored in the memory locations 312 along with the receiver identifier 309.

It will be appreciated that PROM, EEPROM, EAROM, and other similar forms of non-volatile memory may be substituted as well for the ROM 308. It will be further appreciated that the RAM 310, the ROM 308, and the processor 306 may be integrated as one or more contiguous integrated circuits as well.

Referring to FIG. 4, an electrical block diagram of the central controller 102 in accordance with the preferred embodiment of the present invention comprises a communication interface 402 for communicating with one of the receivers 103, 105 over one of the telephone lines 106. The communication interface 402 is coupled to a processor 404 for processing responses communicated to the communication interface. The processor 404 is coupled to a RAM 408 for storing the responses. The RAM 408 comprises response locations 410 for storing reported responses along with receiver identifier locations 412 for identifying the receiver 103, 105 receiving each reported response.

The responses can comprise "positive" responses, in which a received response uniquely identifies one of the responding portable communication units 108. The responses further can comprise "non-positive" responses, in which a received response does not uniquely identify a single one of the responding portable communication units 108, but can identify two or more of the responding portable communication units 108. The receiver identifier 309 is utilized for associating a geographic location with a responding portable communication unit and is of greatest usefulness in a system having more than a single fixed communication unit 101. This is because, in a system having a plurality of the fixed communication units 101, the central controller 102 can utilize a single fixed communication unit 101 determined to be within range of a responding portable communication unit 108 for communications subsequent to the initial poll and simulcast response.

The RAM 408 further comprises a page queue location 413 for queuing for a subsequent transmission a plurality of selective call addresses and associated information defining parameters of the response, corresponding to a random group of page requests. The processor 404 is further coupled to a ROM 416 for non-volatile storage of a subscriber database 418 and firmware elements for controlling the central controller 102. It will be appreciated that other forms of non-volatile memory, such as PROM, EEPROM, EAROM, and magnetic disk memory, can be utilized for the ROM 416. The firmware elements comprise an evaluation element 420 for evaluating a stored received positive response to derive therefrom an identity of a responding portable communication unit 108. The firmware elements further comprise an examination element 422 for examining a stored received non-positive response to derive therefrom identities of at least two portable communication units 108 that have responded while interfering with one another at one of the plurality of receivers 103, 105.

The firmware elements also comprise an analysis element 424 for analyzing the identities derived by the evaluation element 420 and the examination element 422, together with the receiver identifier 309 corresponding to each received response, to derive a probable location for each identified portable communication unit 108. The firmware elements still further comprise a repoll element 426 for controlling the fixed communication unit 101 to generate a special repoll, in response to any of the polled portable communication units 108 remaining unidentified by the evaluation element 420 and the examination element 422, the special repoll for requesting another response from the polled portable communication units 108 that remain unidentified.

The firmware elements also comprise a programmer 428 for programming subsets of three portable communication units 108 to respond simultaneously on a common response channel with a response comprising a common subset bit pattern for identifying the subset along with one of three unique bit patterns for identifying the portable communication unit 108 in accordance with the present invention. The programmer 428 comprises a definition element 430 for defining during the subsequent transmission of the queued selective call addresses the subset of the plurality of portable communication units. The definition element 430 defines each subset of the portable communication units 108 to correspond to groups of three of the queued selective call addresses, thereby dynamically controlling each subset for grouping together responses sent from the three corresponding portable communication units 108 after the subsequent transmission of the queued selective call addresses and associated information defining the response parameters. A data format for the subsequent transmission is discussed herein below in reference to FIG. 9.

The processor 404 is also coupled to an input interface 406 for receiving page requests at the telephone input 110, and further coupled to an encoder/transmitter controller 414 for interfacing with the transmitter 104 over one of the telephone lines 106 for transmitting pages and messages to the portable communication units 108. The hardware elements of the central controller 102 are conventional and are similar to the hardware elements of the model E09PED0552 PageBridge® paging terminal manufactured by Motorola, Inc. of Schaumburg, Ill. The firmware elements 420, 422, 424, 426, 428, 430 and the organization and utilization of the RAM 408 within the central controller 102 comprise new elements in accordance with the preferred embodiment of the present invention.

Referring to FIG. 5, a portion of a bit assignment diagram 500 for the acknowledge-back communication system 100 depicts a bit assignment plan for the portable communication units 108 in accordance with the preferred embodiment of the present invention. In the bit assignment diagram 500 the first column 516 identifies each portable communication unit 108, while the second column 508 depicts subset bits assigned in common to a subset of the portable communication units 108, and the third column 518 depicts a unique bit pattern assigned individually to each portable communication unit 108 within each subset. The bit assignment diagram 500 groups the first, second, and third portable communication units 108 into a first subset having a common subset bit pattern ending in 00, as depicted by rows 501, 502, 503. The bit assignment diagram 500 groups the fourth, fifth, and sixth portable communication units 108 into a second subset having a common subset bit pattern ending in 01, as depicted by rows 504, 505, 506. Within each of the assigned subsets, the three portable communication units 108 of the subset are assigned unique bit patterns 510, 512, 514, consisting of bit patterns 001, 010, and 100. For additional portable communication units 108 beyond the six portable communication units 108 depicted in the portion of the bit assignment diagram 500, the subset bit and unique bit pattern assignment continue in a similar manner, each subset having three portable communication units 108 assigned a common subset bit pattern to identify the subset, and each portable communication unit 108 of the subset assigned one of the unique bit patterns 510, 512, 514 to identify the portable communication unit 108 within the subset.

During operation of the acknowledge-back communication system 100, the central controller 102 preferably groups into subsets of size three the portable communication units 108 that have pages queued for transmission. The central controller 102 then programs the subsets of portable communication units 108 with response codes comprising a common subset bit pattern as depicted in the second column 508, plus one of the unique bit patterns 510, 512, 514. In response to a poll directed to the subset, the subset portable communication units 108 respond simultaneously on a common response channel and can be identified by the acknowledge-back communication system in accordance with the present invention, as explained herein below.

Because the responding portable communication units 108 respond simultaneously on a common response channel, each of the plurality of receivers 103, 105 that receive a response can receive one, two, or all three responses that are simulcast from the subset of the portable communication units 108. In the case of a single received response, there is no interference, and the responding portable communication unit 108 can be determined from the one of the unique bit patterns 510, 512, 514 received. In the case of multiple received responses, there is interference among the multiple radio signals received, and the resultant received bit patterns decoded will comprise certain bit positions that are indeterminate. The advantages of selecting the bit patterns 001, 010, and 100 as the unique bit patterns 510, 512, 514 for identifying the simultaneously responding portable communication units 108 can best be understood by examination of FIGS. 6 and 7.

Referring to FIG. 6, an interference bit pattern diagram 600 for the acknowledge-back communication system 100 in accordance with the preferred embodiment of the present invention is depicted. The first column 610 of the interference bit pattern diagram 600 lists all possible combinations of two or three interfering portable communication units 108. The second column 612 depicts possible resultant received unique bit patterns, wherein the letter X represents a bit that is indeterminate, i.e., the bit can be either 1 or 0, depending upon the portable communication unit 108 that is received with the highest signal strength. It should be noted that the common subset bit pattern is unaffected by interference, because all portable communication units 108 of each subset simulcast the same common subset bit pattern, and bits received from multiple portable communication units 108 will reinforce each other. Only unique bit patterns for identifying the individual portable communication units 108 of the subset differ from one another and thus can cause indeterminate bit positions when received from multiple portable communication units 108.

The third column 614 of the interference bit pattern diagram 600 depicts the portable communication units 108 identified by the possible unique bit patterns that can result from specifically interfering portable communication units 108. For example, the first row 602 illustrates that when the first and second portable communication units 108 interfere at a receiver 103, 105, the received interference bit pattern can identify either the first portable communication unit 108, the second portable communication unit 108, or both, depending on the values of the indeterminate bits depicted in the second column 612. No combination of the indeterminate bits, however, can falsely identify the third portable communication unit 108 that is not one of the interfering portable communication units 108 of the first row 602.

Examination of all the rows 602, 604, 606, 608 of the interference bit pattern diagram 600 reveals that for any combination of interfering portable communication units 108, the possible received unique bit patterns have a possibility of identifying only the portable communication units 108 actually involved in the interference. A portable communication unit 108 not involved in the interference advantageously is not falsely identified by any of the possible received unique bit patterns.

Referring to FIG. 7, a detection diagram 700 for the acknowledge-back communication system 100 in accordance with the preferred embodiment of the present invention depicts all possible interference combinations of received unique bit patterns in the first column 702. The second column 704 depicts the portable communication units 108 that are identified by the received unique bit pattern of the corresponding row.

Due to the nature of the FSK transmissions utilized by the acknowledge-back communication system 100, a portably communication unit 108 that is received by a receiver 103, 105 at a somewhat, e.g., six dB, higher signal strength than the signal strength of other portable communication units 108 will "capture" the receiver 103, 105. This fact implies that the most likely received unique bit patterns of the possible combinations depicted in the first column 702 will be 001, 010, or 100, thereby positively identifying a single portable communication unit 108 of the subset. In a system with multiple receivers 103, 105 that are geographically disperse it is likely that another of the receivers 103, 105 will detect portable communication units 108 that are not detected by one or more of the other receivers 103, 105. In any event, the acknowledge-back communication system 100, in accordance with the preferred embodiment of the present invention, will repoll any subset members whose response remains undetected after analysis by the central controller 102 of the responses received by all the receivers 103, 105.

It will be appreciated that alternative sizes of subsets, e.g., each subset grouping two, four or N (N=any integer) portable communication units 108 can be substituted for the subset size in accordance with alternative embodiments of the present invention. Subset sizes of two, four and N portable communication units 108 would require two, four, and N bit positions in the corresponding unique bit patterns, respectively, to perform without ambiguity in accordance with the present invention.

Thus, the present invention provides a method and apparatus for increasing the volume of acknowledgment responses that can be transmitted in an ack-back communication system. The present invention advantageously does not require additional ack-back channels or a utilization of a higher bit rate on the ack-back channels.

Figure 8:
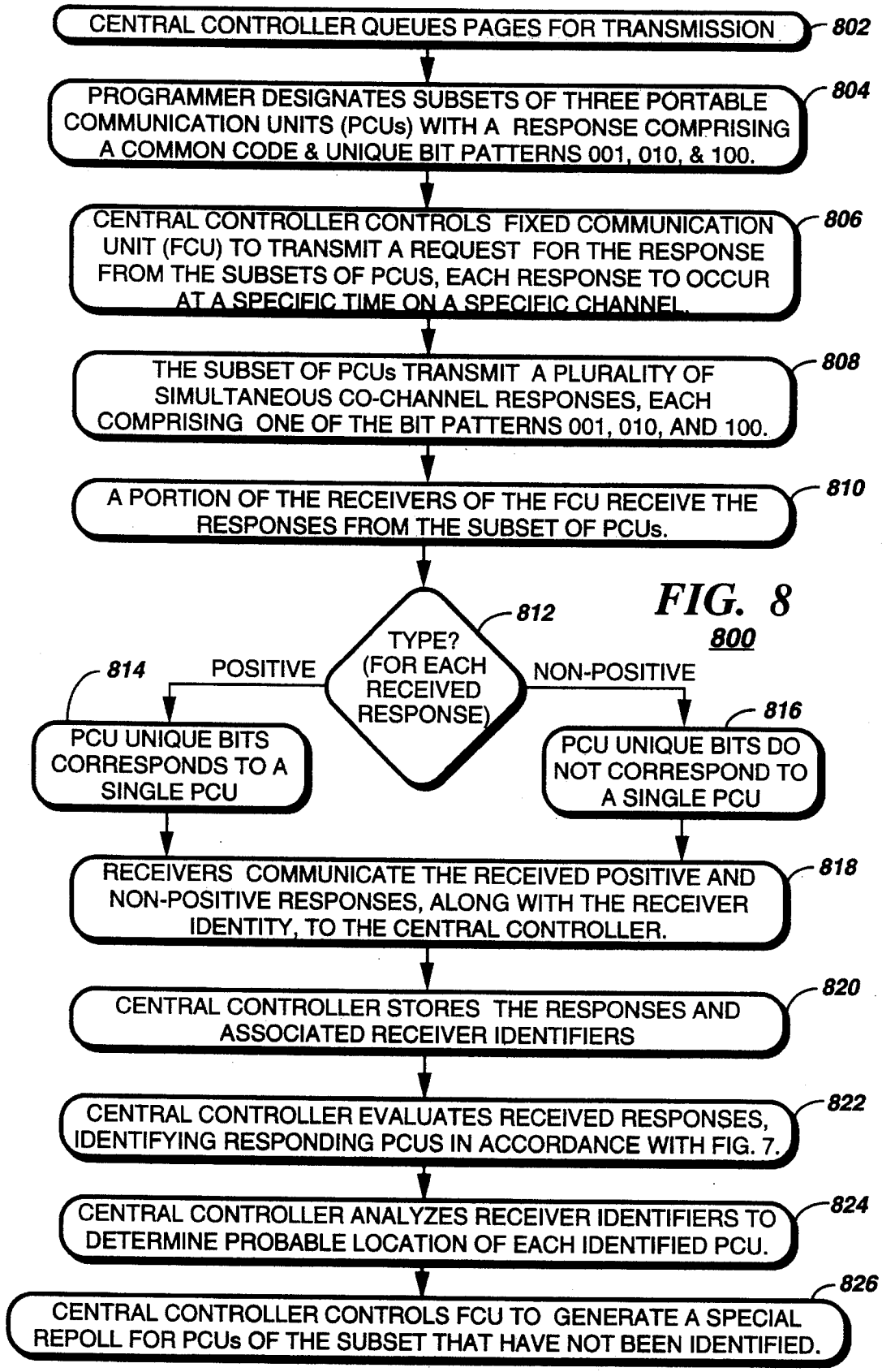
FIG. 8 is a flow chart depicting operation of the acknowledge-back communication system in accordance with the preferred embodiment of the present invention.

Referring to FIG. 8, a flow chart 800 depicting operation of the acknowledge-back communication system 100 in accordance with the preferred embodiment of the present invention begins with the central controller 102 queuing 802 pages for transmission. In response, the programmer 428 designates 804 subsets of three portable communication units 108 for which there is a page in queue with a response comprising a common code for identifying the subset, and one of the three unique bit patterns 001, 010, and 100 for identifying each of the three portable communication units 108 in the subset. Next, the central controller 102 controls 806 the fixed communication unit 101 to transmit a request for the designated response from the subset at a specific time on a specific channel. Next, the portable communication units 108 of the subset each transmit 808 a response comprising the designated one of the unique bit patterns at the specific time on the specific channel. The portable communication units 108 preferably also transmit the common code of the subset to further reinforce the identification of the subset, which is further identifiable from the time and channel utilized for the response.

A portion of the receivers 103, 105 receive 810 the simulcast responses from the portable communication units 108 and check 812 to determine whether the received response is positive or non-positive. If the response is positive, then the received unique bit pattern corresponds 814 to a single portable communication unit 108. If the response is non-positive, then the received unique bit pattern does not correspond 816 to a single portable communication unit 108. In either case, the receivers 103, 105 communicate 818 the received responses, along with the corresponding receiver identifier 309, to the central controller 102. The central controller 102 stores 820 the responses and corresponding receiver identifiers 309 in the response locations 410 and receiver identifier locations 412 therefor, respectively.

Next, the central controller 102 examines and evaluates 822 the stored receiver responses to identify the responding portable communication units 108 in accordance with the detection diagram 700. In addition, the central controller 102 analyzes 824 the corresponding stored receiver identifiers 309 to determine a probable location for each identified portable communication unit 108. For example, if a portable communication unit 108 is identified by a receiver 103, 105 that is positioned in a central location and by the receivers 103, 105 positioned in three additional locations that are adjacent to the central location, then the central controller 102 determines that the portable communication unit 108 is probably in the central location.

Finally, the central controller 102 controls 826 the fixed communication unit 101 to generate a special repoll for any portable communication units 108 of the subset that remain unidentified after the analysis of all the stored responses.

Because the special repoll requests responses from only portable communication units 108 that were missed by the original poll, any respondents whose signals were masked by other portable communication units 108 during the original response will have an improved probability of being received intact during the response to the special repoll.

Figure 9:
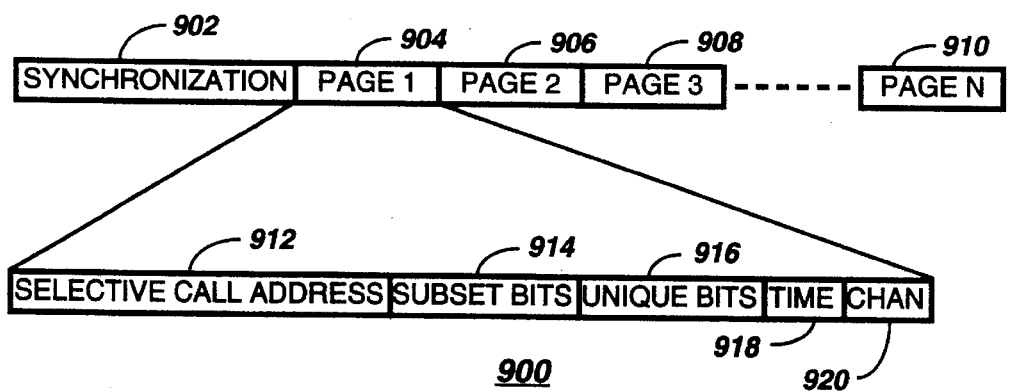
FIG. 9 is a signal diagram depicting the structure of data sent from the fixed communication unit to the portable communication units in the acknowledge-back communication system in accordance with the preferred embodiment of the present invention.

Referring to FIG. 9, a signal diagram 900 depicts the structure of data sent from the fixed communication unit 101 to the portable communication units 108 in the acknowledge-back communication system 100 in accordance with the preferred embodiment of the present invention. The data format begins with synchronization bits 902 for synchronizing the portable communication units 108 to the transmissions of the fixed communication unit 101. The synchronization bits 902 are followed by pages 904, 906, 908, 910, each comprising a selective call address 912, a designated common subset bit pattern 914 for use in the response, a designated unique bit pattern 916 for use in the response, a designated time 918 for initiation of the response, and a designated channel 920 for the response. A portable communication unit 108, having determined that one of the pages 904, 906, 908, 910 is directed to a selective call address preprogrammed within the portable communication unit 108, will respond by transmitting the designated common subset bit pattern 914 and the designated unique bit pattern 916, at the designated time 918 on the designated channel 920.

It will be appreciated that alternative systems may omit certain portions of the data depicted in the signal diagram 900. For example, a first alternative system utilizing a single response channel may eliminate sending the designated channel 920 by pre-programming the single response channel into the portable communication units 108. A second alternative system may, for example, eliminate sending the designated time 918 by pre-programming the portable communication units 108 to respond a fixed time interval after a marker, e.g., one-hundred milliseconds after receipt of a specific, reserved bit pattern. A third alternative system may omit the requirement for the portable communication units 108 to transmit the designated common subset bit pattern 914 in the response, relying instead upon the initiation time and channel utilized for the response to identify the subset transmitting the response.

Figure 10:
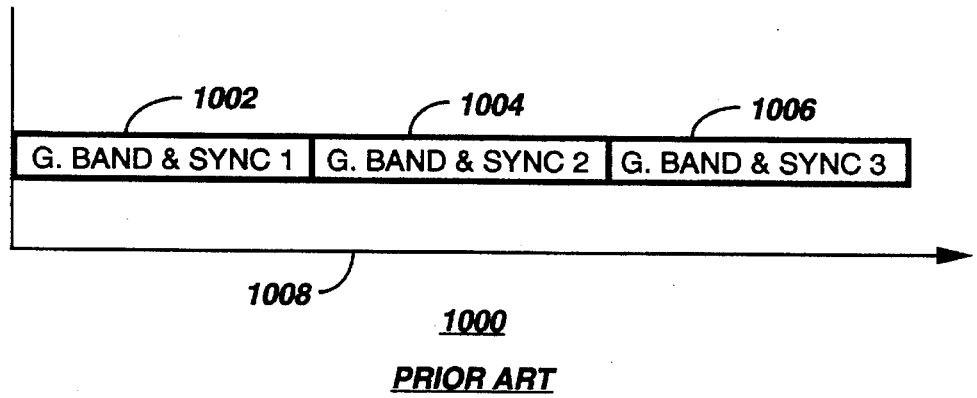
FIG. 10 is a signal diagram depicting the structure of data sent from the portable communication units to the fixed communication unit in a conventional acknowledge-back communication system.

Referring to FIG. 10, a signal diagram 1000 depicts the structure of data sent from the portable communication units 108 to the fixed communication unit 101 in a conventional acknowledge-back communication system. For example, three co-channel acknowledge-back responses 1002, 1004, 1006 are returned sequentially in the conventional system. The three sequential responses 1002, 1004, 1006 require three times the amount of time required for a single one of the responses 1002, 1004, 1006, as depicted by the time axis 1008. A typical ack-back system, for example, requires thirty-two bit times for each response, comprising guard band & synchronization transmission. The conventional system would thus require ninety-six bit times to transmit three responses.

Figure 11:
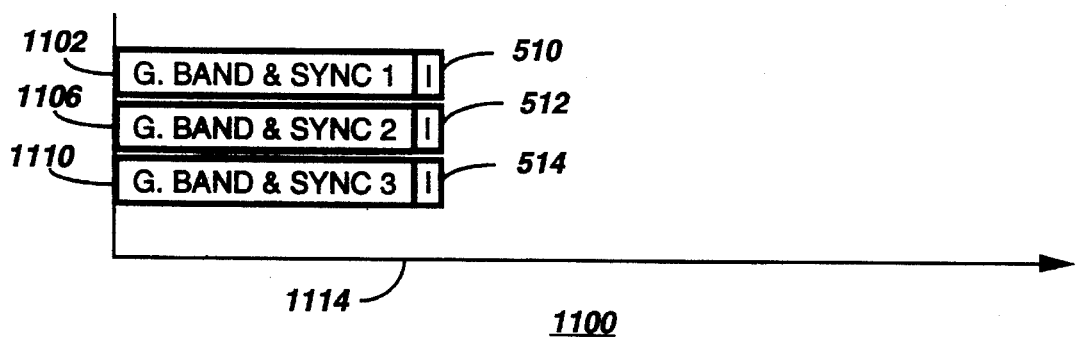
FIG. 11 is a signal diagram depicting the structure of data sent from the portable communication units to the fixed communication unit in the acknowledge-back communication system in accordance with the preferred embodiment of the present invention.

Referring to FIG. 11, a signal diagram 1100 depicts the structure of data sent from the portable communication units 108 to the fixed communication unit 101 in the acknowledge-back communication system 100 in accordance with the preferred embodiment of the present invention. Three co-channel acknowledge-back responses 1102, 1106, 1110, along with the three unique bit patterns 510, 512, 514 are simulcast in the acknowledge-back communication system 100. Using thirty-two bit times for each response comprising guard band and synchronization transmission, as in the example above, plus three bit times to send the unique bit patterns 510, 512, 514, results in only thirty-five bit times to simulcast the three responses in accordance with the present invention, as depicted by the time axis 1114. Thus, the present invention advantageously can provide 2.74 times the number of response transmissions per channel compared to the response transmissions the conventional system can transmit in a given time period.

A final consideration worthy of note is that operation of the acknowledge-back communication system 100 in accordance with the preferred embodiment of the present invention prefers that when multiple responses are received at one of the receivers 103, 105, the received bits of the responses are synchronized with one another. The term "synchronized" as used here is defined to mean that corresponding bit positions within the multiple responses are not displaced from one another by more than one-half of the duration of one bit of the response, else simulcast reinforcement of bits having the same value cannot be relied upon. Variables such as system clock tolerances, differential delays due to differential distances between transmitters and receivers, differential data decode times, differential response initiation times, system data rates, and length of the response all can affect relative synchronization of multiple received simulcast responses.

To determine whether the received simulcast responses can be synchronized accurately enough to perform in accordance with the preferred embodiment of the present invention in a practical acknowledge-back communication system, calculations were made to determine the effects on synchronization caused by expected system tolerances. For example, utilizing a fixed-to-portable unit bit rate of twenty-four-hundred bits per second, a portable-to-fixed unit bit rate of one-hundred bits per second, a response bit length of twenty bits, and expected tolerances on the other variables listed herein above, synchronization calculations have determined that the worst case displacement of multiply received bit positions of the response is only two percent of the duration of one bit of the response. This determination indicates that the acknowledge-back communication system 100 will perform in accordance with the present invention and further will do so with a high degree of robustness.

Thus, the present invention provides a method and apparatus that advantageously increases the volume of acknowledgment responses that can be transmitted in an acknowledge-back communication system. The present invention does not require additional ack-back channels or a utilization of a higher bit rate on the ack-back channels than is required in a conventional ack-back system. Also advantageously, the present invention can perform robustly in a system utilizing practical data rates and having a normal expected range of system tolerances.

What is claimed is:

1. A method of determining identities of respondents to a poll transmitted by a fixed communication unit in a radio communication system including a central controller, a plurality of portable communication units, and the fixed communication unit, wherein the fixed communication unit comprises a transmitter and a plurality of geographically disperse receivers, the method comprising the steps of:

programming a plurality of bit patterns within a subset of the plurality of portable communication unit for identifying individual portable communication units of said subset, each bit pattern corresponding uniquely to a portable communication unit and chosen such that when a group of at least two of the portable communication units are received simultaneously by a receiver of the plurality of receivers, thereby producing an interference bit pattern in the receiver, the interference bit pattern provides a non-zero probability of correctly identifying at least a portion of said group, and a substantially zero probability of erroneously identifying a portable communication unit not in said group;

transmitting thereafter from said subset a plurality of simultaneous, co-channel responses to the poll, a response comprising one of said plurality of bit patterns transmitted without modification, exactly as programmed; and determining therefrom identities of received portable communication units of said subset by the interference bit patterns received by the plurality of receivers.

2. The method according to claim 1, wherein said programming step comprises in the central controller the steps of:

receiving a plurality of page requests for a random group of portable communication units;

queuing for subsequent transmission a plurality of selective call addresses corresponding to said random group; and defining during said subsequent transmission said subset of the plurality of portable communication units to comprise said random group, thereby dynamically controlling said subset for grouping together responses sent from said random group in response to said subsequent transmission.

3. The method according to claim 1, further comprising in the fixed communication unit the steps of:

receiving a positive response at a portion of the plurality of receivers, the positive response comprising a bit pattern corresponding uniquely to a portable communication unit of said subset that has responded;

receiving a non-positive response at another portion of the plurality of receivers, the non-positive response comprising a bit pattern that does not correspond uniquely to a portable communication unit of said subset; and communicating the received positive and non-positive responses and a receiver identifier from each of the respective portions of the plurality of receivers to the central controller.

4. The method according to claim 3, further comprising in the central controller the steps of:

storing the received positive and non-positive responses and the receiver identifiers communicated from the plurality of receivers; and evaluating a stored received positive response to derive therefrom an identity of a responding portable communication unit.

5. The method according to claim 4, further comprising in the central controller the step of examining a stored received non-positive response to derive therefrom identities of at least two portable communication units of said subset that have responded while interfering with one another at one of the plurality of receivers.

6. The method according to claim 5, further comprising in the central controller the step of analyzing the identities derived in said evaluating and examining steps, together with the receiver identifier corresponding to each received response, to derive a probable location for each identified portable communication unit.

7. The method according to claim 5, further comprising in the central controller the step of controlling the fixed communication unit to generate a special repoll, in response to any of said subset remaining unidentified after said evaluating and examining steps, the special repoll requesting another response from the portable communication unit of said subset that remain unidentified.

8. Apparatus in a radio communication system for transmitting a poll and determining identities of respondents to said poll, said apparatus comprising:

controller means for controlling said radio communication system;

fixed communication means coupled to said controller means for transmitting said poll and further for receiving a response to said poll, wherein said fixed communication means comprises a transmitter and a plurality of receivers positioned in geographically disperse locations;

a plurality of portable communication units coupled to said fixed communication means for receiving said poll and generating a response; and programmer means for coupling to ones of said plurality of portable communication units for programming therein a plurality of bit patterns for identifying each individual portable communication unit within a subset of said plurality of portable communication units, each bit pattern corresponding uniquely to a portable communication unit and chosen such that when a group of at least two of said portable communication units are received simultaneously by a receiver of said plurality of receivers, thereby producing an interference bit pattern in said receiver, said interference bit pattern provides a non-zero probability of correctly identifying at least a portion of said group, and a substantially zero probability of erroneously identifying a portable communication unit not in said group, wherein said plurality of portable communication units each comprise response transmitter means for transmitting from said subset, after programming by said programmer means, a plurality of substantially simultaneous, co-channel responses to said poll, a response comprising one of said plurality of bit patterns transmitted without modification, exactly as programmed by said programmer means, and wherein said controller means comprises processor means coupled to said response transmitter means for determining identities of received portable communication units of said subset by interference bit patterns received by said plurality of receivers.

9. The apparatus according to claim 8, wherein said controller means further comprises:

input means for receiving a plurality of page requests for a random group of portable communication units; and storage means coupled to said input means for queuing for subsequent transmission a plurality of selective call addresses corresponding to said random group, and wherein said programmer means comprises definition means coupled to said storage means for defining during said subsequent transmission said subset of said plurality of portable communication units to comprise said random group, thereby dynamically controlling said subset for grouping together responses sent from said random group in response to said subsequent transmission.

10. The apparatus according to claim 8, wherein said response to said poll is a received positive response at a portion of said plurality of receivers, said received positive response comprising a bit pattern corresponding uniquely to a portable communication unit of said subset that has responded, and wherein said response to said poll is a received non-positive response at another portion of said plurality of receivers, said received non-positive response comprising a bit pattern that does not correspond uniquely to a portable communication unit of said subset, and wherein said plurality of receivers comprise means for communicating said received positive and non-positive responses and a receiver identifier to said controller means.

11. The apparatus according to claim 10, further comprising in said controller means:

storage means for storing said received positive and non-positive responses and said receiver identifiers communicated from said plurality of receivers; and evaluation means for evaluating a stored received positive response to derive therefrom an identity of a responding portable communication unit.

12. The apparatus according to claim 11, further comprising examination means in said controller means for examining a stored received non-positive response to derive therefrom identities of at least two portable communication units of said subset that have responded while interfering with one another at one of said plurality of receivers.

13. The apparatus according to claim 12, further comprising in said controller means analysis means coupled to said evaluation means and to said examination means for analyzing said identities derived by said evaluation means and said examination means, together with said receiver identifier corresponding to each received response, to derive a probable location for each identified portable communication unit.

14. The apparatus according to claim 12, further comprising in said controller means repoll means coupled to said evaluation means and to said examination means for controlling said fixed communication unit to generate a special repoll, in response to any of said subset remaining unidentified by said evaluation means and said examination means, said special repoll requesting another response from said portable communication units of said subset that remain unidentified.

15. Apparatus in a radio communication system for transmitting a poll and determining identities of respondents to said poll, said apparatus comprising:

a central controller for controlling said radio communication system;

a fixed communication unit coupled to said central controller for transmitting said poll and further for receiving a response to said poll, wherein said fixed communication unit comprises a transmitter and a plurality of receivers positioned in geographically disperse locations;

a plurality of portable communication units coupled to said fixed communication unit for receiving said poll and generating a response; and a programmer for coupling to ones of said plurality of portable communication units for programming therein a plurality of bit patterns for identifying each individual portable communication unit within a subset of said plurality of portable communication units, each bit pattern corresponding uniquely to a portable communication unit and chosen such that when a group of at least two of said portable communication units are received simultaneously by a receiver of said plurality of receivers, thereby producing an interference bit pattern in said receiver, said interference bit pattern provides a non-zero probability of correctly identifying at least a portion of said group, and a substantially zero probability of erroneously identifying a portable communication unit not in said group, wherein said plurality of portable communication units each comprise a response transmitter for transmitting from said subset, after programming by said programmer, a plurality of substantially simultaneous, co-channel responses to said poll, a response comprising one of said plurality of bit patterns transmitted without modification, exactly as programmed by said programmer, and wherein said central controller comprises a processor coupled to said response transmitter for determining identities of received portable communication units of said subset by interference bit patterns received by said plurality of receivers.

16. The apparatus according to claim 15, wherein said central controller further comprises:

an input interface for receiving a plurality of page requests for a random group of portable communication units; and a memory coupled to said input interface for queuing for subsequent transmission a plurality of selective call addresses corresponding to said random group, and wherein said programmer comprises a definition element coupled to said memory element for defining during said subsequent transmission said subset of said plurality of portable communication units to comprise said random group, thereby dynamically controlling said subset for grouping together responses sent from said random group in response to said subsequent transmission.

17. The apparatus according to claim 15, wherein said response to said poll comprises a received positive response at a portion of said plurality of receivers, said received positive response comprising a bit pattern corresponding uniquely to a portable communication unit of said subset that has responded, and wherein said response to said poll comprises a received non-positive response at another portion of said plurality of receivers, said received non-positive response comprising a bit pattern that does not correspond uniquely to a portable communication unit of said subset, and wherein said plurality of receivers comprise a communication interface for communicating said received positive and non-positive responses and a receiver identifier to said central controller.

18. The apparatus according to claim 17, further comprising in said central controller:

a memory for storing said received positive and non-positive responses and said receiver identifiers communicated from said plurality of receivers; and an evaluation element for evaluating a stored received positive response to derive therefrom an identity of a responding portable communication unit.

19. The apparatus according to claim 18, further comprising an examination element in said central controller for examining a stored received non-positive response to derive therefrom identities of at least two portable communication units of said subset that have responded while interfering with one another at one of said plurality of receivers.

20. The apparatus according to claim 19, further comprising in said central controller an analysis element coupled to said evaluation element and to said examination element for analyzing said identities derived by said evaluation element and said examination element, together with said receiver identifier corresponding to each received response, to derive a probable location for each identified portable communication unit.

21. The apparatus according to claim 19, further comprising in said central controller a repoll element coupled to said evaluation element and to said examination element for controlling said fixed communication unit to generate a special repoll, in response to any of said subset remaining unidentified by said evaluation element and said examination element, said special repoll requesting another response from said portable communication units of said subset that remain unidentified.

\* \* \* \* \*

UNITED STATES PATENT AND TRADEMARK OFFICE
CERTIFICATE OF CORRECTION

PATENT NO. : 5,530,437
DATED : June 25, 1996
INVENTOR(S) : Goldberg

It is certified that error appears in the above-indentified patent and that said Letters Patent is hereby corrected as shown below:

Col. 14, line 3, delete "unit" and replace with --units--

Signed and Sealed this

Twenty-ninth Day of October 1996

Attest:

BRUCE LEHMAN

*Attesting Officer*  *Commissioner of Patents and Trademarks*